United States Patent [19]

Whittle

[11] 4,314,296

[45] Feb. 2, 1982

[54] TRANSDUCER HEAD MOUNTING STRUCTURES

[75] Inventor: William C. Whittle, La Verne, Calif.

[73] Assignee: Bell & Howell Company, Chicago, Ill.

[21] Appl. No.: 102,801

[22] Filed: Dec. 12, 1979

Related U.S. Application Data

[63] Continuation-in-part of Ser. No. 939,533, Sep. 5, 1978, abandoned.

[51] Int. Cl.³ .......................... G11B 5/56; G11B 21/24
[52] U.S. Cl. .................................... 360/109; 360/128
[58] Field of Search ................... 360/109, 105–106, 360/104, 128–129

[56] References Cited

U.S. PATENT DOCUMENTS

| | | | |
|---|---|---|---|
| 2,969,584 | 1/1961 | Bobb | 360/109 |
| 3,034,109 | 5/1962 | Maclay | 360/128 |
| 3,308,450 | 3/1967 | Bourdon et al. | 360/109 |
| 3,326,440 | 6/1967 | Barnes et al. | 360/90 |
| 4,093,966 | 6/1978 | Hall | 360/109 |
| 4,216,505 | 8/1980 | Grant et al. | 360/104 |

FOREIGN PATENT DOCUMENTS

| | | |
|---|---|---|
| 837353 | 6/1960 | United Kingdom . |
| 1054402 | 1/1967 | United Kingdom . |
| 1119423 | 7/1968 | United Kingdom . |
| 1226183 | 3/1971 | United Kingdom . |
| 1244230 | 8/1971 | United Kingdom . |
| 1340242 | 12/1973 | United Kingdom . |
| 1347728 | 2/1974 | United Kingdom . |
| 1516045 | 6/1978 | United Kingdom . |
| 2016787 | 9/1979 | United Kingdom . |

Primary Examiner—Alfred H. Eddleman
Attorney, Agent, or Firm—Benoit Law Corporation

[57] ABSTRACT

A mounting structure for a pair of transducer heads has a base and integral riser beam for forming a rigid inverted T-shaped structure wherein the riser beam extends perpendicularly to a midportion of the base. The transducer heads are mounted on opposite sides of the riser beam. The supporting structure may have a pair of T-shaped profiles extending at right angles to each other. Individual tilt adjustment with or without azimuth adjustment facilities may be provided for each transducer head.

55 Claims, 8 Drawing Figures

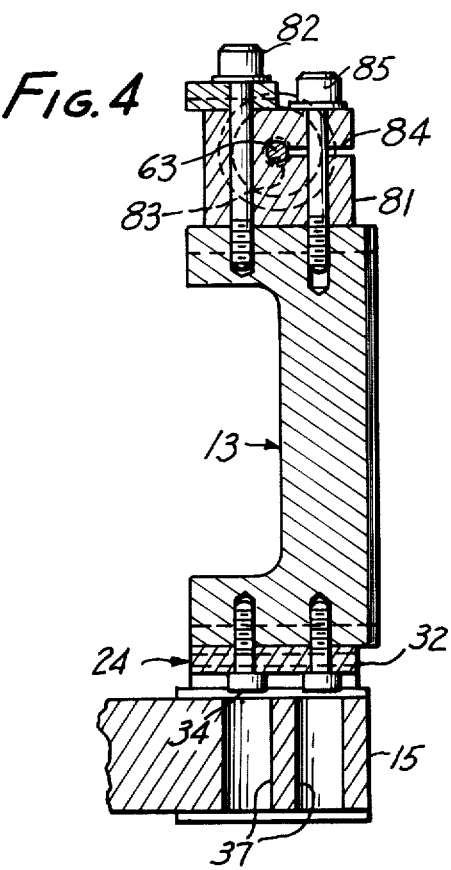
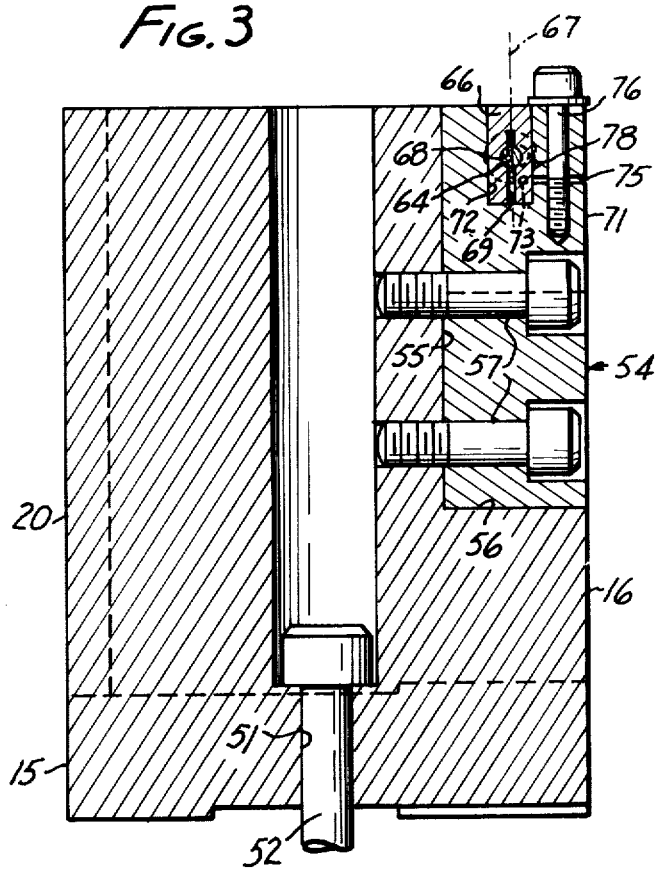
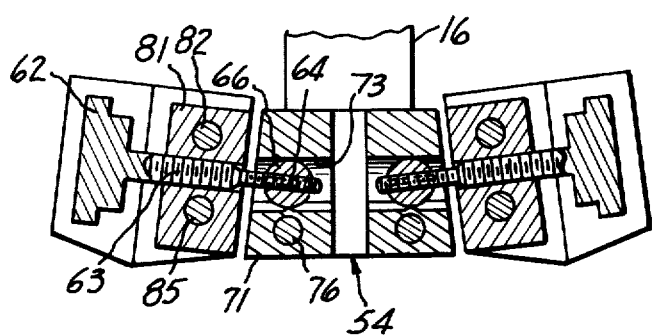
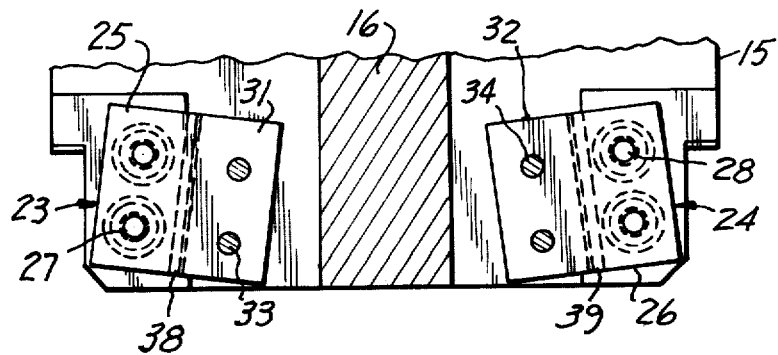

TRANSDUCER HEAD MOUNTING STRUCTURES

CROSS-REFERENCE

This is a continuation-in-part of Patent Application Ser. No. 939,533, filed Sept. 5, 1978, now abandoned, for TRANSDUCER HEAD MOUNTING STRUCTURES, by the subject inventor.

BACKGROUND OF THE INVENTION

1. Field of the Invention

The subject invention relates to mounting structures and methods, to transducer head mounts and to information recording or transducing systems.

2. Prior-Art Statement

Transducer heads and transducer head mounting structures are well known in various fields of endeavor. By way of example, and not by way of limitation, transducer heads are extensively used in information recording and playback. Familiar examples in this respect are magnetic recording and playback heads used in magnetic tape recording systems.

By way of further example, reference may be had to U.S. Pat. No. 3,326,440, by C. A. Barnes et al, issued June 20, 1967, and disclosing a high precision tape transport mechanism. Among various tape transport parts and components, that patent discloses a head mount including a heavy metal bracket having a base flange, a vertical plate rising from the base flange and a further flange projecting horizontally from the vertical plate and overhanging several transducer heads. The transducer heads, in turn, are supported on a metal spacer block having a top layer of elastomeric material which is pressed against the transducer heads for damping purposes.

In one embodiment thereof, the system of the cited patent employs for each transducer head a differential screw with which the particular head may be adjustably inclined in the plane of the adjacent traveling tape. In particular, the differential screw has a first thread meshing with a threaded bushing in the above mentioned overhanging horizontal flange, and a second thread having a pitch different than the mentioned first thread and meshing with a threaded bore of a tongue. That tongue is part of a flexible beam which has a reduced thickness portion and, on one side of that portion, is connected to the above mentioned overhanging horizontal flange while being connected to the particular transducer head at the other side of the reduced thickness portion.

With that type of construction, the cited patent proposes to adjust the inclination of reproducing heads in high precision tape transport mechanisms. A difficulty can, however, be seen in that the transducer heads according to the cited reference are only supported at the lower ends by elastomeric material and that the entire precision mount of the individual transducers is relegated to the upper region at the above mentioned overhanging flange. The particular prior-art structure also requires the provision of considerable play or divergence between the screw attaching the above mentioned tongue to the transducer head and the corresponding bore in that tongue. In practice, this may provide a source of performance tolerances.

Another previously used head mount also employs a differential screw which, in that instance, has an axis of rotation extending in effect at right angles to the long dimension of an elongate head. Means coupled to a stationary structure for receiving one of these threads of the differential screw in threaded engagement include a cylindrical member having a longitudinal axis of rotation and an internal thread corresponding to the mentioned one thread of the differential screw and extending at right angles to the axis of rotation of the cylindrical member. The cylindrical member also has an axial slot intersecting the internal thread. The other of the threads of the differential screw is received in a connector that is attached to the particular transducing head. The mentioned cylindrical member is clamped into meshing engagement with the mentioned one thread of the differential screw by a clamping screw which extends at right angles to the axis of rotation of the cylindrical member.

In practice, this requires that the clamping screw be adjustable from the space in front of the transducer heads, which tends to encumber the assembly process and a subsequent adjustment of the clamping screw.

Moreover, despite a multitude of existing or proposed mounting structures, there persists a need for transducer mounts of increased stiffness at relatively low mass or weight.

Furthermore, existing transducer mounts require the provision of holes in their structure for the reception of fasteners for attaching the mount to a base plate. In practice, such mounting holes engender a variety of critical tolerances.

SUMMARY OF THE INVENTION

It is a broad object of this invention to overcome the above mentioned disadvantages.

It is a related object of this invention to provide improved transducing head mounts and mounting methods.

It is a germane object of this invention to provide for facilitated operation of transducer heads and increased accessibility of important parts thereof.

It is also an object of this invention to provide improved information transducing and particularly playback equipment.

Other objects of the invention will become apparent in the further course of this disclosure.

From a first aspect thereof, the subject invention resides in a mount for a pair of transducer heads, comprising, in combination, a base and integral riser beam jointly forming a rigid inverted T-shaped structure wherein the riser beam extends perpendicularly to a midportion of the base, and means connected to the base and to the riser beam for mounting the transducer heads on opposite sides of the riser beam.

From another aspect thereof, the subject invention resides in a mount for a pair of transducer heads, comprising, in combination, a supporting structure having a first T-shaped profile and a second T-shaped profile at right angles to the first T-shaped profile, and means connected to the supporting structure for mounting the transducer heads in spaced relationship on the supporting structure at the first and second T-shaped profiles.

From another aspect thereof, the subject invention resides in a mount for a transducer head, comprising, in combination, a base and an integral riser beam extending perpendicularly to the base, means connected between the base and one end of the transducer head for tiltably supporting the transducer head, and means connected between the riser beam and another end of the transducer head for varying the azimuth of the transducer head relative to the riser beam, including a differential screw having two threads of different pitch and a first axis of rotation extending parallel to the base, a cylindrical member having a longitudinal second axis of rotation and an internal thread corresponding to one of said threads and extending at right angles to the second axis of rotation, the cylindrical member having an axial slot intersecting the internal thread, and a clamp attached to the riser beam, having a bore extending parallel to the riser beam for receiving the cylindrical member, and including a clamping screw extending parallel to the second axis of rotation and means for translating a clamping force from the clamping screw to the cylindrical member for clamping the cylindrical member into meshing engagement with the one thread, and means coupled to the transducer head at the other end for receiving the other of the threads of the differential screw in threaded engagement.

From another aspect thereof, the subject invention resides in a mount for a transducer head, comprising, in combination, a base and an integral riser beam extending perpendicularly to the base, means connected between the base and one end of the transducer head for tiltably supporting the transducer head, and means connected between the riser beam and another end of the transducer head for varying the azimuth of the transducer head relative to the riser beam, including a differential screw having two threads of different pitch and a first axis of rotation extending parallel to the base, means coupled to the riser beam for receiving one of the threads of the differential screw in threaded engagement including a cylindrical member having a longitudinal second axis of rotation and an internal thread corresponding to the one thread and extending at right angles to the second axis of rotation, the cylindrical member having an axial first slot intersecting the internal thread, a clamp attached to the riser beam, having a first bore extending parallel to the riser beam for receiving the cylindrical member, a second bore intersecting the first bore and providing a clearance for part of the screw, a second slot extending tangentially to the second bore, and a clamping screw located at the second slot and extending parallel to the second axis of rotation for clamping the cylindrical member into meshing engagement with the one thread, and means coupled to the transducer head at the other end for receiving the other of the threads of the differential screw in threaded engagement.

From another aspect thereof, the subject invention resides in apparatus for mounting a transducer head relative to a precision plate, comprising, in combination, two spaced mounting pins attached and extending perpendicularly to the precision plate, a base having notches spaced to receive the mounting pins in abutment with the base, means at the base for attaching the base to the precision plate, and means connected to the base for mounting the transducer head on the base.

From another aspect thereof, the subject invention resides in a mount for a pair of transducer heads, comprising, in combination, first means connected to one end of one of the trasducer heads for tiltably supporting that one transducer head, second means connected to one end of the other of the transducer heads for tiltably supporting that other transducer head, third means for supporting the first and second means, and a resilient clamp having a first end connected to another end of the mentioned one transducer head and having a second end connected to another end of the mentioned other transducer head.

From another aspect thereof, the subject invention resides in a mount for a transducer head, comprising, in combination, means connected to one end of the transducer head for tiltably supporting that transducer head, means for setting the tilt of the transducer head, including a clamped resilient beam having a free end connected to another end of the transducer head, and means for adjusting the azimuth of the transducer head at right angles to the tilt, including means for bending the mentioned beam.

From another aspect thereof, the subject invention resides also in a method of mounting a transducer head and, more specifically, resides in the improvement comprising in combination the steps of providing a resilient beam with a width larger than its height, tiltably supporting the transducer head at one end thereof, clamping the resilient beam at a distance from an end thereof, attaching the resilient beam at the mentioned end thereof to another end of the transducer head and setting the tilt of the transducer head with the aid of the resilient beam, and bending the attached beam in the direction of its mentioned width to adjust the azimuth of the transducer head having the mentioned set tilt.

From another aspect thereof, the subject invention resides also in a method of mounting a pair of transducer heads and, more specifically, resides in the improvement comprising in combination the steps of tiltably supporting one of the transducer heads at one end thereof, tiltably supporting the other of the transducer heads at one end thereof, providing a resilient clamp, connecting a first end of the clamp to another end of the one transducer head, connecting a second end of the clamp to another end of the other transducer head, and adjusting the azimuth of either transducer head by bending the clamp.

BRIEF DESCRIPTION OF THE DRAWINGS

The invention and its various aspect and objects will become more readily apparent from the following detailed description of preferred embodiments thereof, illustrated by way of example in the accompanying drawings, in which like reference numerals designate like or functionally equivalent parts, and in which:

FIG. 3 is a stepped section taken along the line 3—3 in FIG. 2;

FIG. 4 is a section taken along the line 4—4 in FIG. 1;

FIG. 5 is a section taken along the line 5—5 in FIG. 2;

FIG. 6 is a section taken along the line 6—6 in FIG. 2;

DESCRIPTION OF PREFERRED EMBODIMENTS

Figure 1:
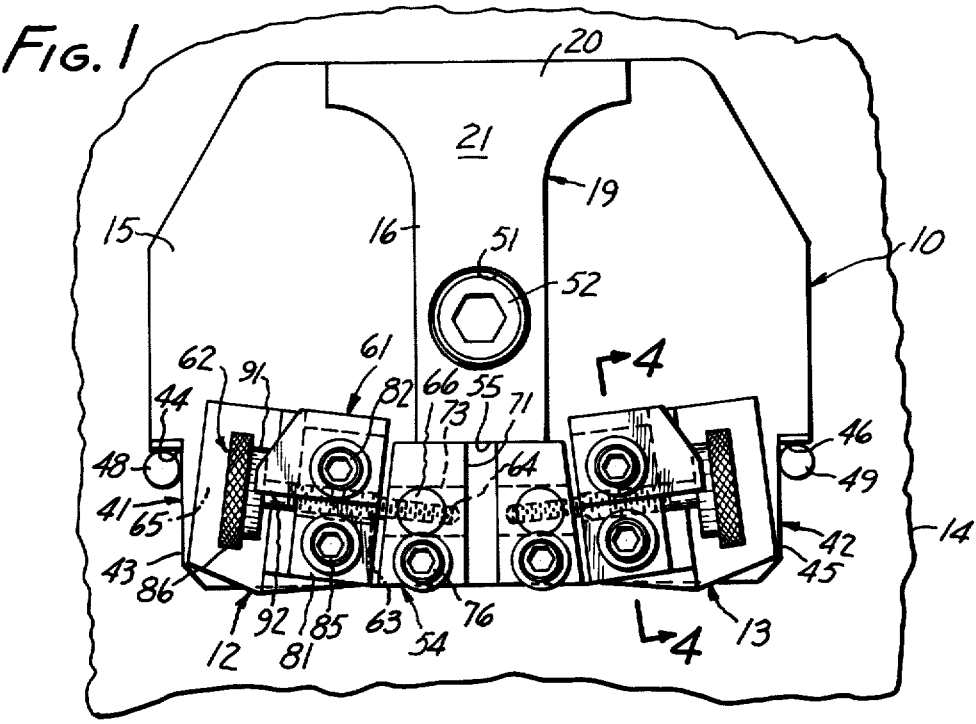
FIG. 1 is a top view of a transducer head mount and related parts in accordance with a preferred embodiment of the subject invention.

The mounting structure 10 shown in the drawings constitutes a mount for a pair of transducer heads 12 and 13. By way of example, these transducer heads may form part of magnetic tape recording and playback equipment. By way of further example, such equipment may include a magnetic tape transport having a precision plate, part of which is seen at 14 in FIGS. 1 and 2.

Figure 2:
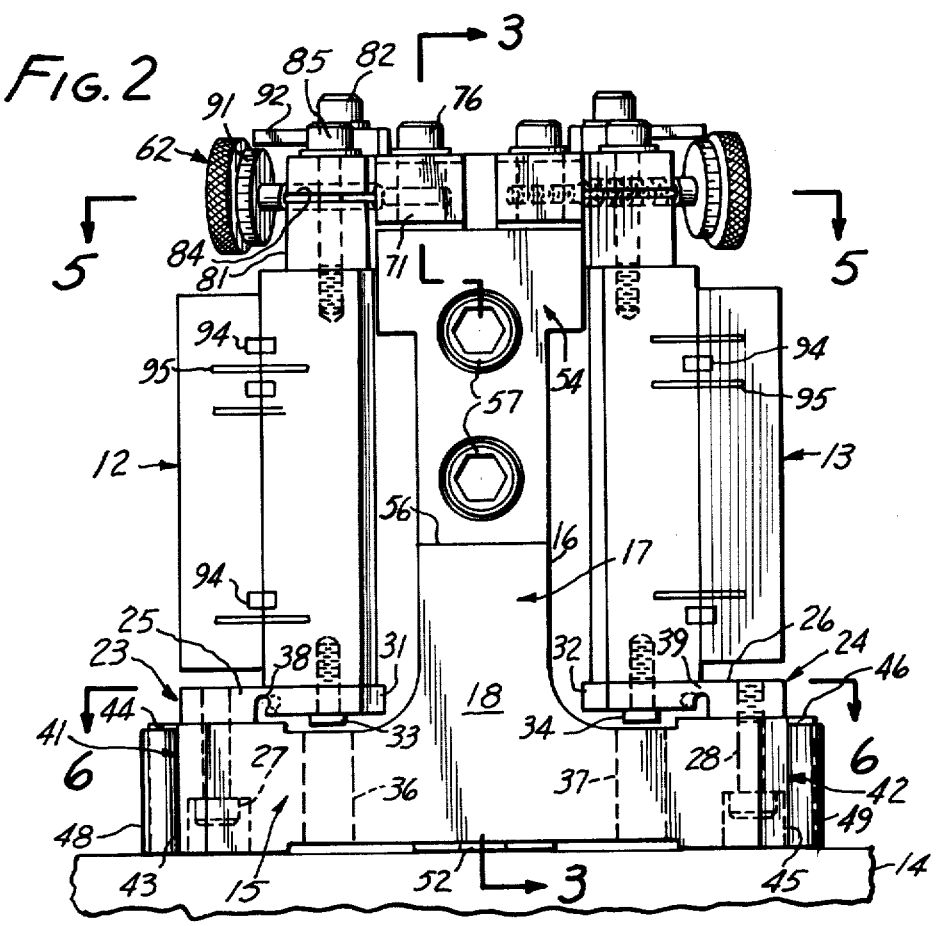
FIG. 2 is an elevation of the transducer head mount of FIG. 1.

The mount 10 has a base 15 and integral riser beam 16 jointly forming a rigid inverted T-shaped structure 17, as best seen in FIG. 2. In such first T-shaped structure 17, the riser beam 16 rises perpendicularly from or extends perpendicularly to a midportion 18 of the base 15.

The mounting structure so far described is able to support the transducer heads 12 and 13 on opposite sides of the riser beam 16 at a high stiffness relative to its mass or weight. By way of example, the mounting structure may be formed of a light weight metal, such as aluminum or an aluminum alloy, shaped by casting or molding, for instance.

In accordance with a preferred further embodiment of the subject invention, the supporting structure 10 has a first T-shaped profile, namely the profile of the inverted T-shaped structure 17, and a second T-shaped profile 19 extending at right angles to the first T-shaped profile. The transducer heads 12 and 13 are mounted in spaced relationship on the supporting structure at the first and second T-shaped profiles.

In particular, the supporting structure 10 specifically shown in the drawings includes the above mentioned base 15, a stiffening rib 20 extending perpendicularly to that base, and the above mentioned riser beam 16 integral with the base 15 and stiffening rib 20. The riser beam 16 extends perpendicularly to the midportion 18 of the base 15 and perpendicularly to a midportion 21 of the stiffening rib 20. The riser beam 16 is thus common to, and forms part of, both the first and second T-shaped profiles 17 and 19. Again, the transducer heads 12 and 13 are mounted on opposite sides of the riser beam 16.

In particular, the specifically illustrated mount 10 includes a flexible beam 23 and a flexible beam 24. Each beam has a stationary portion 25 and 26 connected or attached to the base 15 by fasteners or screws 27 and 28, respectively. Each flexible beam 23 or 24 also has a tongue 31 or 32 attached to one end, namely the lower end, of the corresponding transducer head 12 or 13 by fasteners or screws 33 or 34. Bores 36 and 37 in the mounting structure base 15 permit access to the screws 33 and 34, respectively, for a selective tightening or loosening of these screws with a screwdriver or other appropriate tool, as well as for an insertion or removal of the screws 33 and 34, as desired or necessary.

As thus seen from the drawings, and particularly from FIGS. 2 and 6, the flexible beam 23 is connected by screws 27 to the base 15 at one side of the riser beam 16 for coupling one end of the transducer head 12 to the base 15.

Similarly, the flexible beam 24 is connected by screws 28 to the base 15 at the opposite side of the riser beam 16 for coupling one end of the other transducer head 13 to the base 15. Each of the beams 23 and 24 has a reduced thickness portion 38 and 39, respectively, for enhancing the flexibility of the beams. The transducer heads 12 and 13 are thus tiltably supported on the base 15.

In practice, the construction according to the illustrated preferred embodiment of the subject invention, employing the flexible beams 23 and 24 for tiltably supporting the transducer heads 12 and 13 at their lower ends at the base 15, is far superior in attainable mounting precision and azimuth adjustability to the above mentioned prior-art proposal which simply supports the transducer heads at their lower ends with an elastomeric pad. In particular, a flexible supporting beam affords a more definite support and a more predictable location of flexure than an elastomeric pad into which the lower end of each transducer head is pressed.

In accordance with a further preferred embodiment of the subject invention, the base 15 has an L-shaped notch 41 and 42 on each side of the riser beam 16. The sides 43 and 44 of the notch 41, and the sides 45 and 46 of the notch 42 extend parallel to the riser beam 16 for receiving mounting pins 48 and 49, respectively, in abutment with the base 15.

In particular, the mounting pins 48 and 49 rise from the precision plate 14 on which the structure 10 is mounted, and which may form part of the above mentioned tape transport.

The base 15 and the riser beam 16 jointly have a stepped bore 51 for receiving a bolt 52 for attaching the mount 10 to the precision plate 14.

Provision of the notches 41 and 42 in conjunction with the mounting pins 48 and 49 provides not only a very efficient and convenient, but also a highly accurate positioning of the structure 10 on the precision plate relative to other parts of the tape transport.

In this respect it is a well-known fact that positioning of parts by pins or screws and corresponding holes becomes more and more a problem as precision requirements are pushed to higher and higher limits. For instance, a first accuracy problem is introduced as to the positioning of the hole which is to receive the particular alignment pin or fastening screw, especially when a rotating drill is employed in forming the hole. As to the hole itself, there are tolerances in various directions between the wall of the hole and the inserted pin or screw shank. According to the illustrated preferred embodiment of the subject invention, these tolerance problems are avoided by the provision of the precision mounting notches 41 and 42 and employment of the mounting pins 48 and 49 in combination with the precision plate 14. In practice, the transducer head mount 10 may simply be slid in between the mounting pins 48 and 49 which retain portions of the mount 10 between the vertical surfaces 43 and 45 at extremely close tolerances, and which similarly determine the exact course of the tape path by means of the vertical precision locating surfaces 44 and 46.

The notches 41 and 42 and mounting pins 48 and 49 are part of a mounting principle or system according to an aspect of the subject invention beyond or apart from the illustrated shape of the mounting structure 10 and head mounting mechanisms shown.

In particular, the apparatus for mounting a transducer head relative to a precision plate 14 according to the currently discussed aspect of the invention has two spaced mounting pins 48 and 49 attached and extending perpendicularly to the precision plate 14. A base 15 has notches 41 and 42 spaced to receive the mounting pins 48 and 49 in abutment with the base 15. Means at the base 15 for attaching the base to the precision plate 14 include the bolt 52 extending through an aperture 51 in the base, with that aperture being spaced from the notches 41 and 42.

In the illustrated preferred embodiment, the notches 41 and 42 have a pair of parallel first surfaces 43 and 45 extending perpendicularly to the precision plate and being spaced from each other by a distance equal to the distance between the spaced mounting pins 48 and 49 for a reception of part of the base 15 between the mounting pins 48 and 49 in abutment with these mounting pins at the parallel surfaces 43 and 45. The illustrated notches 41 and 42 have a pair of second surfaces 44 and 46 extending perpendicularly to the precision plate 14 and to the first surfaces 43 and 45 for receiving the mounting pins 48 and 49 in abutment therewith. In the illustrated preferred embodiment, the notches are thus L-shaped. This avoids both the type of sticking and the type of slopping customarily encountered with pin-recipient holes.

In this manner, the tolerance requirements are removed from the mounting hole 51 and attachment bolt 52 which may simply be threaded into a tapped hole (not shown) in the precision plate 14.

The mount 10 includes a further T-shaped structure 54 connected to the riser beam 16 in spaced relationship to the base 15 for coupling corresponding upper ends of the transducer heads 12 and 13 to the riser beam 16. To this end, the riser beam 16 has a notch delimited by a vertical surface 55 and a horizontal surface 56 for receiving the third T-shaped structure 54. Screws 57 attach that structure to the riser beam, interconnecting the three T-shaped structures 17, 19 and 54 into a stiff and rigid transducer head mounting unit.

The third T-shaped structure 54 also supports mechanisms for selectively tilting each transducer head relative to the riser beam 16. In this respect, angular adjustments into and out of the plane of the magnetic recording tape running past the transducers 12 and 13, that is angular adjustments relative to the plane on which FIG. 2 is drawn, are generally referred to as tilt adjustments. On the other hand, angular adjustments of the transducer heads in the plane of the tape, that is angular adjustments relative to the plane on which FIG. 4 is drawn, are generally referred to as azimuth adjustments. The subject FIGS. 1 to 6 primarily address themselves to azimuth adjustment, but it should be understood that the means disclosed for this purpose could also be reoriented and employed to effect tilt adjustments. Moreover, the broad expression "tilting" and terminology of like import is herein intended to cover generically azimuth and tilt adjustments as well as other angular position variations of the transducer heads, unless the particular term "tilt" is employed.

The azimuth varying or adjustment mechanism 61 for the transducer head 12 includes a differential screw 62 having two threads 63 and 64 of different pitch and a first axis of rotation 65 extending parallel to the base 15. The thread 63 is cut on a relatively large diameter and has a coarse pitch relative to the second thread 64 which is cut on a smaller diameter and has a finer pitch. The third T-shaped structure 54 carries a device for receiving the thread 64 of the differential screw in threaded engagement. That device includes a cylindrical member 66 having a longitudinal second axis of rotation 67 which, as seen in FIG. 3, extends at right angles to the axis of rotation of the differential screw 62 or thread 64. The pivot member 66 has an internal thread 68 corresponding to the thread 64 and extending at right angles to the second axis of rotation 67. The cylindrical member 66 also has an axial first slot 69 intersecting the internal thread 68. A clamp 71 is attached to the riser beam 16 or, more precisely, integral with the third T-shaped structure 54 which, in turn, is attached to the riser beam. The clamp 71 has a first bore 72 extending parallel to the riser beam or to the vertical axis thereof. That first bore 72 serves to receive the cylindrical member so that it can pivot about its axis 67.

The clamp 71 also has a second bore 73, indicated in FIG. 1. The second bore 73 intersects the first bore 72 at right angles and provides a clearance for part of the differential screw 62.

No novelty is herein claimed for the parts of the azimuth adjustment mechanism 61 so far specifically described and designated by reference numerals in the range between, and including, numerals 62 and 73. Novelty is, however, claimed herein for a combination of these parts with the clamping mechanism presently to be described.

By way of background, an obvious way of clamping the cylindrical member 66 into meshing engagement with the differential screw thread 68 has been to provide a clamping screw which extends parallel to the base 15 along the location of the presently to be described second slot 75. In practice, this would have the drawback of requiring accessibility with respect to the particular clamping screw from the front of the transducer assembly. This is generally disadvantageous since the assembly of the various parts and components can then not proceed from one plane and since the need for such clamping screw accessibility tends to impose design limitations as to the structuring of the tape path or the placement of other components of the tape transport.

According to the illustrated preferred embodiment of the subject invention, the clamp 71 has a second slot 75 extending tangentially to the second bore 73, and a clamping screw 76 located at the second slot 75 and extending parallel to the second axis 67 or, in other words, to the pivot axis of the cylindrical member 66. When the clamping screw 76 is tightened, the height of the second slot 75 is diminished in that the upper part of the clamp 71 through which the shank of the screw 76 extends is drawn downwardly toward the lower part of the clamp 75 into which the screw 76 is threaded.

This, in turn, forces the lower portion of the mentioned upper part of the clamp 71 into engagement with the lower portion of the cylindrical member 66. To provide for a clearly defined situation and clamping force application, the mentioned upper part of the clamp 71 has a tooth or projection 78 in the second bore 73 at the second slot 75 for engaging the cylindrical member 66.

The arrangement according to the illustrated preferred embodiment described with reference to parts 75, 76 and 78 thus in effect serves to take the clamping force generated by tightening of the screw 76, to translate such force by an angle of 90° and to apply such translated force via tooth or projection 78 to the cylindrical member 66 at right angles to the axis of rotation 67. Such translated clamping force thus will close or diminish the width of the first slot 69 of the cylindrical member 66, thereby clamping the internal thread 68 into meshing engagement with the portion 64 of the differential screw 62.

The azimuth adjustment mechanism 61 includes a further clamp 81 attached to the transducer head 12 at its upper end by screws 82. The clamp 81 has a further internal thread 83 meshing with the larger thread 63 of the differential screw 62. The clamp 81 also has a slot 84 intersecting the internal thread 83. A clamping screw 85 extends through such third slot 84 and adjacent portions of the further clamp 81. Upon tightening of the clamping screw 85, the internal thread 83 is clamped into meshing engagement with the differential screw portion 83.

The differential screw 62 has a knurled head 86 for facilitating manual azimuth adjustments. Due to the structure and combination of parts according to the subject invention, the attainable azimuth adjustments reach such a precision that they are reproducible in practice. By way of example, it is thus possible to adjust the differential screw 62 to provide the best possible azimuth adjustment as to a given first recorded tape with respect to which information is being transduced by the head 12. If thereafter the head 12 is employed to transduce information with respect to a recorded second tape, the differential screw 62 may be adjusted to provide the best possible azimuth for transducing information as to such second tape. If thereafter information is again being transduced as to the mentioned first tape, the differential screw 62 may be rotated to restore the azimuth adjustment most suitable to that first tape. The same applies to subsequent information transducing operations as to the mentioned second tape, for which the original azimuth adjustment may again be accurately reproduced with the aid of the differential screw 62.

Because of this high accuracy and reproducibility of azimuth adjustment, graduated means may be employed according to the illustrated preferred embodiment of the subject invention for indicating any tilted position of the particular transducer head, so that such azimuth position may subsequently be reproduced.

In particular, the azimuth varying mechanism 61 includes a dial 91 on the differential screw, having graduations for indicating any azimuth position of the transducer head 12. In the illustrated preferred embodiment, the accuracy of the azimuth indication is aided by an index element 92 which is attached to the further clamp 81 by the screw 82, and which has an edge cooperating with the dial 91.

The azimuth adjustment mechanism 61 has a mirror image counterpart at the second transducer head 13. To avoid cluttering of the drawings, identical or corresponding parts in such further azimuth adjustment mechanism are not designated by reference numerals in FIGS. 1, 2 and 5. However, like reference numerals are employed in FIG. 4 for like or corresponding parts of the azimuth adjustment mechanism for the second transducer head 13.

The transducer head mount according to the subject invention does not lose its high precision if the structure 10 is initially made as a casting or molding of a suitable metal, such as aluminum or an aluminum alloy. Rather, machining can still be held to a minimum, being primarily confined to the machining of pads at the support beams 23 and 24 and at the underside of the structure 10 where the mount contacts the precision plate 14. Also, the notch for receiving the third T-shaped structure 54 may be machined at the surfaces 55 and 56.

The structure 10, moreover, may be employed for mounting various types of transducing heads. For instance, magnetic recording heads may be mounted at the location of the illustrated transducing heads 12 and 13.

In that case, azimuth adjustment mechanisms may not be required and the upper ends of the transducer heads 12 and 13 may be attached rigidly to the third T-shaped structure 54. On the other hand, the transducing heads 12 and 13 may be multi-channel or track reproducing or playback heads, in which the illustrated azimuth adjustment mechanisms are preferably employed. In this respect, FIG. 2 only shows a few playback head elements 94 with intervening magnetic shielding elements 95. In practice, there would, of course, be as many playback head elements as there are channels to be handled by the particular playback head assembly.

Figure 7:
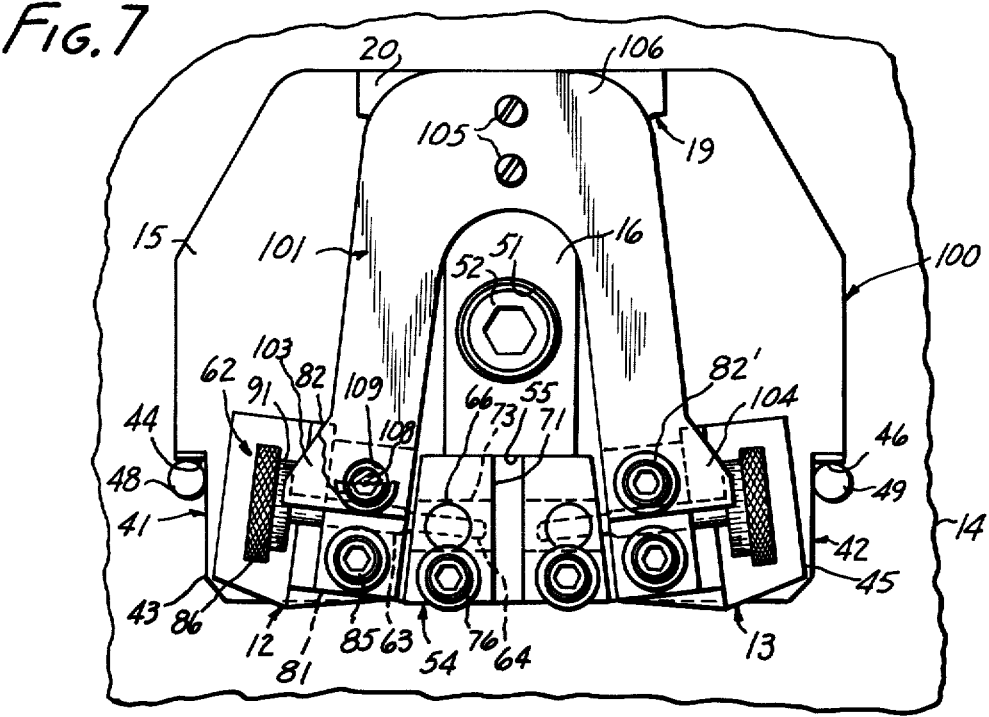
FIG. 7 is a view similar to FIG. 1, showing an improvement in accordance with a further preferred embodiment of the subject invention.
Figure 8:
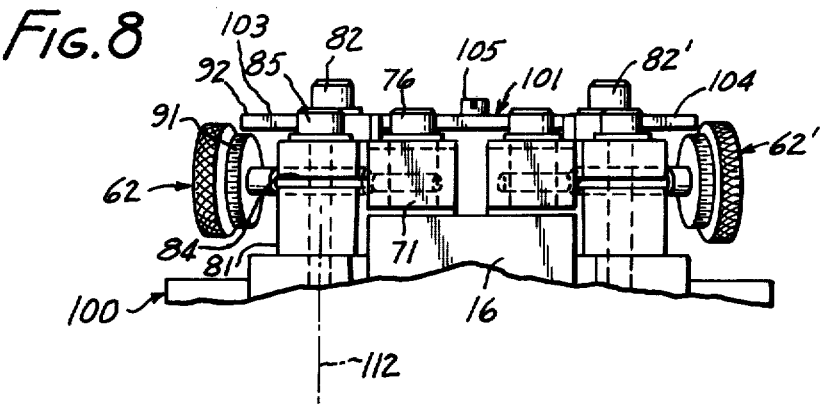
FIG. 8 is an upper part of an elevation of the improved transducer head mount of FIG. 7.

The improvements according to further preferred embodiments of the subject invention shown in FIGS. 7 and 8 may in general have the same form, shape and structure as the embodiments of FIGS. 1 to 6. Reference may, therefore, be had to FIGS. 1 to 6 as far as the nature, function and operation of parts and components is concerned, which are shown in FIGS. 7 and 8 with their like reference numerals as their counterparts in FIGS. 1 to 6.

According to the illustrated preferred embodiments shown in FIGS. 7 and 8, a modified mounting structure or transducer head assembly 100 includes a resilient clamp 101 which, as seen in FIG. 7, may be of a C or U-shaped type. The resilient clamp 101 has an end 103 connected to the transducer head 12 and an end 104 to the transducer head 13.

In practice, the clamp 101 may be part of the mounting means for varying the tilt of each transducer head. In accordance with the terminology set forth above, "tilt" refers in this context to angular adjustments of the transducer heads 12 and 13 into and out of the plane of the magnetic recording tape running past these transducer heads.

Tilt adjustments, in particular, may be viewed as angular adjustments of the heads 12 and 13 relative to the plane on which FIGS. 2 and 8 are drawn.

As seen in FIG. 8, the improved transducer mount 100, in addition to the clamp 101, includes mechanisms 62 and 62' for varying the azimuth of each transducer head 12 and 13 at right angles to the tilt just mentioned.

In this respect, the clamp 101 and its associated fasteners 82 etc. may be viewed as means connected to the riser beam 16, or between such riser beam and the upper end of the transducer head 12 and 13, for varying the tilt of the particular transducer head or heads. The resilient clamp 101 may thereby be viewed as resiliently coupling the upper ends of the transducer structures 12 and 13 to the riser beam 16 of the rigid mounting structure.

According to the illustrated preferred embodiment of the subject invention, the resilient clamp 101 is supported intermediately of the first and second ends 103 and 104 thereof. As seen in FIGS. 7 and 8, screws 105 or other suitable fasteners may be employed for attaching or clamping the part 101 to the riser beam 16 which, for present purposes, may be considered as including the above mentioned second T-shaped profile 19 or stiffening rib 20.

As seen in FIG. 7, the clamp 101 may have a bight portion 106 located intermediately of the first and second clamp ends 103 and 104 and being, in turn, attached or clamped to the riser beam 16 or mounting structure 19.

According to the aspect of the invention shown in FIGS. 7 and 8, the resilient clamp 101 permits adjustment and control of head stack tilt at assembly. To this end, a certain play between the clamp 101 and its mounting bolts or fasteners at 82, 82' and/or 105 may be provided. By way of example, and not by way of limitation, this principle presently is explained with reference to the fastener 82.

In particular, the fastener 82, as seen in FIG. 7, includes a threaded bolt 108 which has a smaller diameter than a bore or hole 109 of the clamp 101 through which the bolt 108 extends. Accordingly, prior to the final tightening of the bolt 108, the tilt of the head 12 may be varied relative to the end 103 of the clamp 101. Such tilt is then set by fully tightening the bolt 108 whereby the fastener 82 in effect clamps the end 103 to the head 12. The same principle may in practice be employed as to the fastener 82′ for adjusting and setting the head 13. Similarly, the tilt of both heads 12 and 13 may simultaneously be adjusted and set or preset by providing and exploiting a play between the clamp 101 and the fasteners 105 at bight portion 106.

During azimuth adjustments, such as with the above mentioned mechanisms 62 and 62′, the attached clamp 101 maintains control of transducer heat tilt. The clamp 101 in particular, provides dynamic stabilization of head stack assemblies during azimuth adjustment. To this end, the support stabilizer or clamp 101 may be positioned and locked with the magnetic head gap line at zero azimuth, and tilt positioned within a predetermined tolerance perpendicularly to the assembly base 15.

During azimuth adjustment (when the azimuth assembly is in a loose condition) the azimuth adjustment screw 62 is turned whereupon the support stabilizer or clamp 101 flexes, allowing azimuth adjustment while maintaining tilt.

According to the illustrated preferred embodiment of the subject invention, the clamp 101 has a width seen in FIG. 7 which is several times larger than its height seen in FIG. 8. In general terms, the clamp 101, in a plane at right angles to an axis extending between the mounting means 23 shown in FIG. 2 and the clamp end 103 seen in FIGS. 7 and 8, has a width larger than the height of the clamp parallel to the latter axis.

The plane referred to in the preceding paragraph is a plane parallel to the plane of the paper on which FIG. 7 is drawn. The axis referred to in the preceding paragraph has been partially indicated at 112 in FIG. 8.

The dynamic stabilization function of the clamp 101 may be further appreciated by analogy to a leaf spring. In particular, the following equation may be employed in this respect.

$$f = (4Pl^3)/(Ebh^3) \qquad (1)$$

wherein:
f = spring deflection,
P = spring tension,
E = modulus of elasticity,
l = length of spring,
b = dimension of spring at right angles to the deflection, and
h = dimension of the spring in the direction of deflection.

Since azimuth adjustments, such as those effected by rotation of the differential screw 62, deflect the clamp 101 in the direction of its width, the factor h in equation (1) represents the width of the clamp seen in FIG. 7, while the factor b represents the height of the clamp 101 seen in FIG. 8. Accordingly, the width of the clamp 101 is subject to the third power in the denominator of equation (1). Since the width of the clamp 101 exceeds several times its height according to the illustrated preferred embodiment of the subject invention, the spring deflection, f, is much smaller if the clamp 101 is deflected in the direction of its width during azimuth adjustments as seen in FIGS. 7 and 8, than when such clamp would be deflected in the direction of its height or, in other words, in a direction perpendicularly to its width. As shown in FIG. 7, the effect presently under consideration may be increased by providing the clamp 101 with an increased width at its bight portion 106, as contrasted to the leg portions of the clamp 101.

The stiffness of the resilient clamp 101 is equal to the differential of the spring tension over the differential of the spring deflection. Within the linear region we may write $$c = P/F \qquad (2)$$

In equation (2), c is the spring constant in units of force per units of length, such as kg/cm in the metric system.

As may be seen from equation (2), the spring constant or hardness of the clamp 101 is very high, corresponding to the fact that the width of the clamp, as mentioned above, is the factor h which is subject to the third or cubic power in the denominator of equation (1). The clamp 101 thus provides the transducer mount or assembly 100 not only with a very high static stability, but also with a high dynamic stabilization. In this respect, reference may be had to the well-known fact that the spring constant, c, plays an important role in oscillation and vibration technology. Because of the above mentioned high spring constant, the clamp 101, though having the nature of a spring, in practice dampens head vibrations or even inhibits their occurrence ab initio. This is a very important feature in the field of high-quality instrumentation tape recording, as well as in such fields as video recording.

Because of the curved nature of the clamp 101, portions of the clamp body in the bight region 106 would attempt to warp out of the plane in which the generally flat clamp is located (such as a plane through the clamp 101 parallel to the plane on which FIG. 7 is drawn). The forces of deformation requisite for this purpose would in practice put up further resistance against deformation of the clamp 101 by either excessive compression or expansion. The clamp thus performs a further static or dynamic stabilizing function beyond the linear region of equations (1) and (2).

Without intended limitation to any particular embodiment, several broad principles or embodiments may, nevertheless, be derived from the disclosure from FIGS. 7 and 8. In particular, it may be seen that the subject invention provides a mount 100 for a pair of transducer heads 12 and 13, comprising, in combination, first means, such as a flexible beam 23 (see FIG. 2), connected to one end of one of the transducer heads for tiltably supporting that one transducer head 12, second means, such as a flexible beam 24, connected to one end of the other of the transducer heads for tiltably supporting that other transducer head 13, and third means, such as a base 15, for supporting the first and second means 23 and 24. According to this aspect of the invention, a resilient clamp 101 has a first end 103 connected to another end of the one transducer head 12 and has a second end 104 connected to another end of the other transducer head 13, as shown in FIGS. 7 and 8. As also shown in these figures, the clamp ends 103 and 104 may advantageously be formed as the above mentioned index elements 92, each of which has an edge cooperating with the dial 91 of the azimuth adjustment screw 62 or 62′.

The subject invention, from a broader aspect thereof, also provides a mount for a transducer head 12 comprising, in combination, means, such as the flexible beam 23 shown in FIG. 2, connected to one end of the transducer head 12 for tiltably supporting that transducer head, and means for setting the tilt of the transducer head, including a clamped resilient beam having a free end 103 connected to another end of the transducer head 12.

By way of example, such clamped resilient beam may be formed by the left leg of the clamp 101 seen in FIG. 7. The mount presently under consideration also includes means for adjusting the azimuth of the transducer head 12 at right angles to the above mentioned tilt. These means according to FIGS. 7 and 8 include the differential screw 62 for bending the beam 101. This beam, in a plane at right angles to an axis 112 extending between the supporting means 23 (see FIG. 2) and the free end 103 (see FIGS. 7 and 8), has a width larger than a height of that beam in the direction of the axis 112. The azimuth adjustment then includes means encompassing, for instance, the differential screw 62 for bending the beam 101 in the mentioned plane; that is, in a plane parallel to the paper on which FIG. 7 has been drawn.

The subject invention also resides in a method of mounting a transducer head 12, comprising the steps of providing a resilient beam 101 with a width larger than its height, and tiltably supporting the transducer head 12 at one end thereof, such as by means of the resilient beam 23 shown in FIG. 2. As shown at 105 in FIGS. 7 and 8, the resilient beam 101 is clamped at a distance from an end 103 thereof. The resilient beam, in turn, is attached at that end 103 to another end of the transducer head 12 and the tilt of that transducer head is set with the aid of the resilient beam 101, such as in the manner described above with reference to the bolt 108 and the larger-diameter aperture 109.

Within the method of the subject invention, the beam 101 is bent in the direction of its larger width to adjust the azimuth of the transducer head having the mentioned set tilt.

In the context of a pair of transducer heads 12 and 13 tiltably supported at their lower or one ends as disclosed with reference to FIG. 2, a preferred method according to the invention provides the resilient clamp 101, connects a first end 103 of that clamp to another end of one transducer head 12, connects a second end 104 of the clamp to another end of the transducer head 13, and adjusts the azimuth of either transducer head by bending the clamp 101.

A preferred embodiment of that method sets the tilt of the transducer heads 12 and 13 at right angles to the azimuth with the aid of the clamp 101, as disclosed above.

The subject extensive disclosure will suggest or render apparent various modifications and variations within the spirit and scope of the subject invention to those skilled in the art.

I claim:

1. A mount for a pair of transducer heads, comprising in combination:
   a base and integral riser beam jointly forming a rigid inverted T-shaped structure wherein said riser beam extends perpendicularly to a midportion of said base; and
   means connected to said base and to said riser beam for mounting said transducer heads on opposite sides of said riser beam.

2. A mount for a pair of transducer heads, comprising in combination:
   a supporting structure having a first T-shaped profile and a second T-shaped profile at right angles to said first T-shaped profile; and
   means connected to said supporting structure for mounting said transducer heads in spaced relationship on said supporting structure at said first and second T-shaped profiles.

3. A mount as claimed in claim 2, wherein:
   said supporting structure includes a base, a stiffening rib extending perpendicularly to said base, and a riser beam integral with said base and stiffening rib, said riser beam extending perpendicularly to a midportion of said base and perpendicularly to a midportion of said stiffening rib, being common to, and forming part of, both said first and second T-shaped profiles; and
   said mounting means including means connected to said base and to said riser beam for mounting said transducer heads on opposite sides of said riser beam.

4. A mount as claimed in claim 1 or 3, wherein:
   said mounting means include means for varying the azimuth of each transducer head relative to said riser beam.

5. A mount as claimed in claim 1 or 3, wherein:
   said mounting means include means for varying the tilt of each transducer head.

6. A mount as claimed in claim 5, wherein:
   said mounting means include means for varying the azimuth of each transducer head at right angles to said tilt.

7. A mount as claimed in claim 1 or 3, wherein said mounting means include:
   means connected to said base at one side of said riser beam for coupling one end of one of said transducer heads to said base;
   means connected to said base at the opposite side of said riser beam for coupling one end of the other of said transducer heads to said base; and
   means connected to said riser beam in spaced relationship to said base for coupling another end of said one transducer head and another end of said other transducer head to said riser beam.

8. A mount as claimed in claim 7, wherein:
   said coupling means connected to said riser beam include means for varying the azimuth of each transducer head relative to said riser beam.

9. A mount as claimed in claim 7, wherein:
   said coupling means connected to said riser beam include means for varying the tilt of each transducer head.

10. A mount as claimed in claim 8, wherein said azimuth varying means include for each transducer head:
    a differential screw having two threads of different pitch and a first axis of rotation extending parallel to said base;
    means coupled to said riser beam for receiving one of said threads of said differential screw in threaded engagement, including a cylindrical member having a longitudinal second axis of rotation and an internal thread corresponding to said one thread and extending at right angles to said second axis of rotation, said cylindrical member having an axial slot intersecting said internal thread, and a clamp attached to said riser beam, having a bore extending parallel to said riser beam for receiving said cylindrical member, and including a clamping screw extending parallel to said second axis of rotation and means for translating a clamping force from said clamping screw to said cylindrical member for clamping said cylindrical member into meshing engagement with said one thread; and means coupled to the particular transducer head for receiving the other of said threads of said differential screw in threaded engagement.

11. A mount as claimed in claim 8, wherein:
said azimuth varying means include for each of said transducer heads graduated means for indicating any azimuth position of the particular transducer head.

12. A mount as claimed in claim 1 or 3, wherein said mounting means include:
first means connected between said base at one side of said riser beam and one end of one of said transducer heads for tiltably supporting said one transducer head;
second means connected between said base at the opposite side of said riser beam and one end of the other of said transducer heads for tiltably supporting said other transducer head; and
adjustable means connected to said riser beam in spaced relationship to said base and to other ends of said one and other transducer heads for selectively tilting each of said transducer heads relative to said riser beam.

13. A mount as claimed in claim 12, wherein said adjustable means include for each transducer head:
a differential screw having two threads of different pitch and a first axis of rotation extending parallel to said base;
means coupled to said riser beam for receiving one of said threads of said differential screw in threaded engagement, including a cylindrical member having a longitudinal second axis of rotation and an internal thread corresponding to said one thread and extending at right angles to said second axis of rotation, said cylindrical member having an axial slot intersecting said internal thread, and a clamp attached to said riser beam, having a bore extending parallel to said riser beam for receiving said cylindrical member, and including a clamping screw extending parallel to said second axis of rotation and means for translating a clamping force from said clamping screw to said cylindrical member for clamping said cylindrical member into meshing engagement with said one thread; and
means coupled to the particular transducer head for receiving the other of said threads of said differential screw in threaded engagement.

14. A mount as claimed in claim 13, wherein:
each of said first and second means includes a flexible beam.

15. A mount as claimed in claim 13, wherein:
said adjustable means include for each of said transducer heads graduated means for indicating any tilted position of the particular transducer head.

16. A mount as claimed in claim 1 or 3, wherein:
said base has an L-shaped notch on each side of said riser beam, with the sides of said notch extending parallel to said riser beam for receiving mounting pins in abutment with the base.

17. A mount as claimed in claim 16, wherein:
said riser beam and base jointly have a bore extending at right angles to said base for receiving a mount attachment bolt.

18. A mount for a transducer head, comprising in combination:
a base and an integral riser beam extending perpendicularly to said base;
means connected between said base and one end of said transducer head for tiltably supporting said transducer head; and
means connected between said riser beam and another end of said transducer head for varying the azimuth of said transducer head relative to said riser beam, including a differential screw having two threads of different pitch and a first axis of rotation extending parallel to said base, a cylindrical member having a longitudinal second axis of rotation and an internal thread corresponding to one of said threads and extending at right angles to said second axis of rotation, said cylindrical member having an axial slot intersecting said internal thread, and a clamp attached to said riser beam, having a bore extending parallel to said riser beam for receiving said cylindrical member, and including a clamping screw extending parallel to said second axis of rotation and means for translating a clamping force from said clamping screw to said cylindrical member for clamping said cylindrical member into meshing engagement with said one thread, and means coupled to said transducer head at said other end for receiving the other of said threads of said differential screw in threaded engagement.

19. A mount as claimed in claim 18, wherein:
said means for tiltably supporting said transducer head include a flexible beam.

20. A mount as claimed in claim 18 or 19, wherein:
said azimuth varying means include graduated means for indicating any azimuth position of said transducer head.

21. A mount as claimed in claim 18 or 19, wherein:
said azimuth varying means include a dial on said differential screw for indicating any azimuth position of the particular transducer head.

22. A mount as claimed in claim 18 or 19, wherein:
said azimuth varying means include a dial on said differential screw and a corresponding index element connected to said transducer head at said other end for indicating any azimuth position of the particular transducer head.

23. A mount as claimed in claim 18 or 19, including:
means connected between said riser beam and said other end of the transducer head for varying the tilt of the transducer head.

24. A mount for a transducer head, comprising in combination:
a base and an integral riser beam extending perpendicularly to said base;
means connected between said base and one end of said transducer head for tiltably supporting said transducer head; and
means connected between said riser beam and another end of said transducer head for varying the azimuth of said transducer head relative to said riser beam, including a differential screw having two threads of different pitch and a first axis of rotation extending parallel to said base, means coupled to said riser beam for receiving one of said threads of said differential screw in threaded engagement including a cylindrical member having a longitudinal second axis of rotation and an internal thread corresponding to said one thread and extending at right angles to said second axis of rotation, said cylindrical member having an axial first slot intersecting said internal thread, a clamp attached to said riser beam, having a first bore extending parallel to said riser beam for receiving said cylindrical member, a second bore intersecting said first bore and providing a clearance for part of said screw, a second slot extending tangentially to said second bore, and a clamping screw located at said second slot and extending parallel to said second axis of rotation for clamping said cylindrical member into meshing engagement with said one thread, and means coupled to the transducer head at said other end for receiving the other of said threads of said differential screw in threaded engagement.

25. A mount as claimed in claim 24, wherein:
said clamp has a projection in said second bore at said second slot for engaging said cylindrical member.

26. A mount as claimed in claim 24 or 25, wherein:
said means for receiving the other of said threads include a further clamp attached to said transducer head at said other end and having a further internal thread meshing with said other of said threads.

27. A mount as claimed in claim 24 or 25, wherein:
said azimuth varying means include a dial on said differential screw for indicating any azimuth position of the particular transducer head.

28. A mount as claimed in claim 24 or 25, wherein:
said azimuth varying means include a dial on said differential screw and a corresponding index element connected to said transducer head at said other end for indicating any azimuth position of the particular transducer head.

29. A mount as claimed in claim 24, including:
means connected between said riser beam and said other end of the transducer head for varying the tilt of the transducer head.

30. A mount for a pair of transducer heads, comprising in combination:
first means connected to one end of one of said transducer heads for tiltably supporting said one transducer head;
second means connected to one end of the other of said transducer heads for tiltably supporting said other transducer head;
third means for supporting said first and second means; and
a resilient clamp having a first end connected to another end of said one transducer head and having a second end connected to another end of said other transducer head.

31. A mount as claimed in claim 30, wherein:
said third means include means for supporting said resilient clamp intermediately of said first and second ends thereof.

32. A mount as claimed in claim 30, wherein:
said third means include a riser beam extending between said transducer heads, and means for supporting said resilient clamp intermediately of said first and second ends on said riser beam.

33. A mount as claimed in claim 30, wherein:
said clamp has a bight portion intermediate of said first and second ends; and
said third means include a base for supporting said first and second means, a riser beam extending from said base between said transducer heads, and means for affixing said bight portion of the clamp to said riser beam.

34. A mount as claimed in claim 30, 31, 32 or 33, wherein:
said clamp, in a plane at right angles to an axis extending between said first means and said first end, has a width larger than a height of said clamp parallel to said axis.

35. A mount as claimed in claim 34, including:
means for adjusting the azimuth of either transducer head, including means for bending said clamp in said plane.

36. A mount as claimed in claim 35, including:
means for adjusting the tilt of each transducer head at right angles to its azimuth.

37. A mount as claimed in claim 36, wherein:
each of said first and second means includes a flexible beam.

38. A mount for a transducer head, comprising in combination:
means connected to one end of said transducer head for tiltably supporting said transducer head;
means for setting the tilt of said transducer head, including a clamped resilient beam having a free end connected to another end of said transducer head; and
means for adjusting the azimuth of said transducer head at right angles of said tilt, including means for bending said beam.

39. A mount as claimed in claim 38, wherein:
said beam, in a plane at right angles to an axis extending between said supporting means and said free end, has a width larger than a height of said beam in the direction of said axis; and
said azimuth adjusting means include means for bending said beam in said plane.

40. A mount as claimed in claim 38 or 39, wherein:
said means for tiltably supporting said transducer head include a flexible beam.

41. Apparatus for mounting a transducer head relative to a precision plate, comprising in combination:
two spaced mounting pins attached and extending perpendicularly to the precision plate;
a base having notches spaced to receive said mounting pins in abutment with said base;
means at said base for attaching said base to said precision plate; and
means connected to said base for mounting said transducer head on said base.

42. Apparatus as claimed in claim 41, wherein:
said notches have a pair of parallel surfaces extending perpendicularly to said precision plate and being spaced from each other by a distance equal to the distance between said spaced mounting pins for a reception of part of the base between said mounting pins in abutment with said mounting pins at said parallel surfaces.

43. Apparatus as claimed in claim 41, wherein:
said notches have a pair of first surfaces extending perpendicularly to said precision plate and being spaced from each other by a distance equal to the distance between said spaced mounting pins for a reception of part of the base between said mounting pins in abutment with said mounting pins at said first surfaces; and
said notches have a pair of second surfaces extending perpendicularly to said precision plate and to said first surfaces for receiving said mounting pins in abutment therewith.

44. Apparatus as claimed in claim 41, 42 or 43, wherein:
said notches are L-shaped.

45. Apparatus as claimed in claim 41, 42 or 43, wherein:
said attaching means include a bolt extending through an aperture in said base spaced from said notches.

46. Apparatus as claimed in claim 45, wherein:
said notches are L-shaped.

47. In a method of mounting a transducer head, the improvement comprising in combination the steps of:
providing a resilient beam with a width larger than its height;
tiltably supporting said transducer head at one end thereof;
clamping said resilient beam at a distance from an end thereof;
attaching said resilient beam at said end thereof to another end of said transducer head and setting the tilt of said transducer head with the aid of said resilient beam; and
bending said attached beam in the direction of said width to adjust the azimuth of said transducer head having said set tilt.

48. A method as claimed in claim 47, including the step of:
providing a flexible beam in addition to said resilient beam; and
tiltably supporting said transducer head at said one end thereof with said additional flexible beam.

49. In a method of mounting a pair of transducer heads, the improvement comprising in combination the steps of:
tiltably supporting one of said transducer heads at one end thereof;
tiltably supporting the other of said transducer heads at one end thereof;
providing a resilient clamp;
connecting a first end of said clamp to another end of said one transducer head;
connecting a second end of said clamp to another end of said other transducer head; and
adjusting the azimuth of either transducer head by bending said clamp.

50. A method as claimed in claim 49, including the step of:
setting the tilt of said transducer heads at right angles of said azimuth with the aid of said clamp.

51. A method as claimed in claim 49 or 50, including the step of:
supporting said resilient clamp intermediately said first and second ends thereof.

52. A method as claimed in claim 51, including the step of:
providing a first flexible beam for tiltably supporting said one transducer head at said one end thereof; and
providing a second flexible beam for tiltably supporting said other transducer head at said one end thereof.

53. A method as claimed in claim 49 or 50, including the steps of:
providing said clamp with a bight portion intermediate said first and second ends; and
supporting said clamp at said bight portion.

54. A method as claimed in claim 49 or 50, including the steps of:
providing said clamp, in a plane at right angles to an axis extending between said one and other ends of said one transducer, with a width larger than a height of said clamp parallel to said axis; and
adjusting the azimuth of either transducer head by bending said clamp in said plane.

55. A method as claimed in claim 54, including the steps of:
providing a first flexible beam for tiltably supporting said one transducer head at said one end thereof; and
providing a second flexible beam for tiltably supporting said other transducer head at said one end thereof.

* * * * *